United States Patent [19]
Jackson

[11] 3,774,144
[45] Nov. 20, 1973

[54] NON-DESTRUCTIVE TROUBLE SHOOTING PROBE

[75] Inventor: Robert Eartis Jackson, Venice, Calif.

[73] Assignee: Lear Siegler, Inc., Santa Monica, Calif.

[22] Filed: May 19, 1972

[21] Appl. No.: 254,900

[52] U.S. Cl. .......... 339/97 T, 339/100, 339/108 TP
[51] Int. Cl. ...................... H01r 11/18, H01r 11/20
[58] Field of Search ...................... 339/97, 100, 108

[56] References Cited
UNITED STATES PATENTS

| | | | |
|---|---|---|---|
| 2,504,338 | 4/1950 | MacLatchie, Jr. | 339/108 TP |
| 2,910,644 | 10/1959 | Shaw | 339/97 T |
| 2,485,881 | 10/1949 | Helin | 339/108 TP |
| 3,378,807 | 4/1968 | Hover | 339/100 |

FOREIGN PATENTS OR APPLICATIONS

| | | | |
|---|---|---|---|
| 1,286,875 | 1/1962 | France | 339/108 TP |

*Primary Examiner*—Joseph H. McGlynn
*Attorney*—Pastoriza & Kelly

[57] ABSTRACT

A probe includes an open ended conducting tube having a sharp conducting point recessed in the end of the tube such that an annular contact by the tube is made with the normal solder hump on a terminal board rather than a point contact as occurs with prior art probes. As a consequence, slippage of the probe from the terminal and possible resulting destruction of certain portions of the terminal board is inhibited.

1 Claim, 4 Drawing Figures

PATENTED NOV 20 1973　　　　　　　　　　　　　　　3,774,144

NON-DESTRUCTIVE TROUBLE SHOOTING PROBE

This invention relates to electrical instruments for trouble shooting and more particularly to an improved trouble shooting probe designed to facilitate effecting temporary electrical contact with selected terminals on a circuit board in a reliable manner and without slippage of the probe.

BACKGROUND OF THE INVENTION

In trouble shooting circuit boards, a probe is normally used to effect an electrical connection at selected terminals on the board. The probe itself is usually connected to a volt meter or other instrument to provide a reading indicating whether conditions at the portion of the circuit being investigated are normal.

The probe itself usually comprises an elongated member about the size of a pencil terminating in a sharp conducting point. Some times the contacting point is made interchangeable and may appear similar to a phonograph needle. In making an electrical contact with a terminal, the operator simply presses the point onto the terminal itself which usually comprises a soldered connection. It is common practice to cover such terminals as well as the entire circuit board with a thin lacquer like paint or coating of insulative material for protection purposes. Thus the trouble shooter must cut through this coating with the sharply pointed portion of the probe to make the necessary contact.

While trouble shooting may be carried on with conventional probes as described above, it is not at all uncommon for the sharply pointed end of the probe to slip off of the terminal when attempting to make contact therewith. The possibility of such slippage is enhanced by the fact that at soldered terminals the solder itself forms a small hump with sloping sides and in attempting to work the point of the probe through the thin insulative coating to effect contact with the solder hump or the component lead within the hump, the point of the probe simply slides down the sides and the probe tends to dig into other portions or surrounding areas of the circuit board. The situation is aggravated by the fact that in boards having the thin lacquer coating or painted insulative surface, the trouble shooter must exert more than normal force on the probe point in attempting to make contact and this greater application of force increases the risk of slipping of the probe end from the terminal.

The foregoing situation is not only extremely irritating to the trouble shooter but in addition tends to destroy portions of the circuit board and/or the terminal.

In spite of the foregoing, there has not, so far as I am aware, ever been given any serious study to the particular problems described above with the result that the same types of trouble shooting probes have been used for years with the same attendant difficulties.

BRIEF DESCRIPTION OF THE PRESENT INVENTION

The present invention contemplates an improved trouble shooting probe wherein the risk of damaging or destruction of circuit board terminals or surrounding areas of the circuit board are minimized and wherein the operation of effecting temporary electrical contact with selected terminals by means of the probe is enormously facilitated all to the end that the trouble shooting operation may be carried out more conveniently, with less irritation, and in less time than is the case with known types of probes.

More particularly, rather than a sharp pointed probe, the present invention contemplates the provision of a rigid elongated conductive tube at the end portion of the probe terminating in an open end for effecting an annular contact with the raised circuit terminal or solder hump, the apex portion of the terminal or solder hump being received within the open end of the tube so that slippage of the probe from the terminal is inhibited.

The preferred embodiment of the probe further includes a conductive member fixedly secured within the tube portion and terminating in a sharp point lying on the axis of the tube and spaced inwardly from the open end of the tube for effecting electrical contact with any exposed end of a component lead extending beyond the apex of the terminal portion surrounded by the tube.

BRIEF DESCRIPTION OF THE DRAWINGS

A better understanding of the invention will be had by now referring to the accompanying drawings in which.

DETAILED DESCRIPTION OF THE INVENTION

Figure 1:
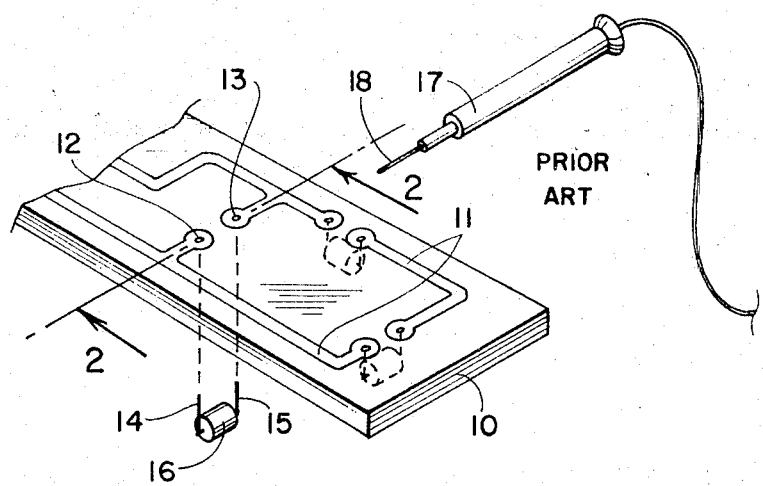
FIG. 1 is a perspective view with certain portions exploded of a typical circuit board portion and prior art trouble shooting probe.

Referring first to FIG. 1 there is shown a portion 10 of a typical circuit board including printed circuit paths 11 and various terminals such as 12 and 13. Components for these circuit boards such as resistors or capacitors, in the particular embodiment illustrated, may be connected to the terminals to define an appropriate circuit by providing drilled holes through the circuit board at the terminal points 12 and 13 and at the other terminal points. The leads such as 14 and 15 for a typical component 16 are then bent and passed through these holes, the component itself lying on the underside of the board. These leads are then soldered directly to the terminal portions of the printed circuit on the top of the board. Other components already in place are indicated in dotted lines in FIG. 1.

In trouble shooting the board or testing for proper voltages at various points in the circuit, a technician or trouble shooter will utilize a probe indicated at 17. The probe shown is a typical prior art type of probe terminating in a contact pin 18 which is normally in the form of a solid shaft terminating in a sharp point. The probe itself may be connected to a suitable meter the other side of which is grounded so that effecting electrical contact between the probe pin and a selected terminal will advise the trouble shooter of the voltage value at that point. In other instances, there may be provided a pair of probes so that voltages across various components may be measured at different portions of the circuit.

Figure 2:
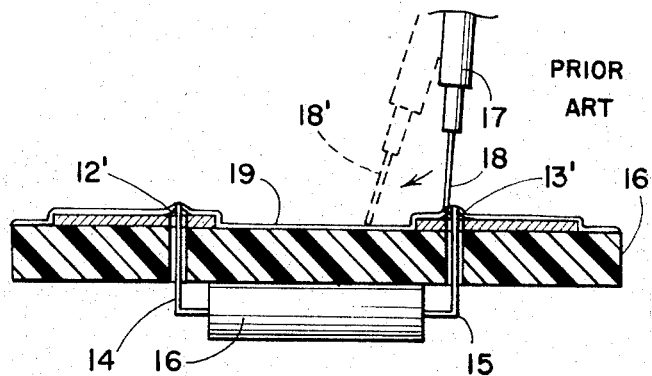
FIG. 2 is an enlarged cross-section taken in the direction of the arrows 2—2 of FIG. 1 useful in explaining problems associated with prior art probes.

Referring now to FIG. 2, the component 16 is shown secured in place in the board and it will be noted that small solder humps 12' and 13' result after the soldering operation of the leads 14 and 15 to the printed circuit terminals. In many instances, it is common practice to provide an insulative protective coating of lacquer like quality over the entire surface of the board including the printed circuit and terminals. This thin coating is indicated at 19 in FIG. 2.

FIG. 2 serves to depict a typical prior art problem in trouble shooting the circuit board with the conventional type probe 17. As shown, the pin 18 is positioned on the contact solder hump 13' but because of the sloping sides of this solder hump and the necessity of applying sufficient force against the terminal to cut through the lacquer like coating, there is a great tendency for the single sharp point of the pin 18 to slip from the terminal and possibly damage other portions of the circuit board in the surrounding area. Such a slipping condition is indicated by the dotted line position of the pin as shown at 18'.

Figure 3:
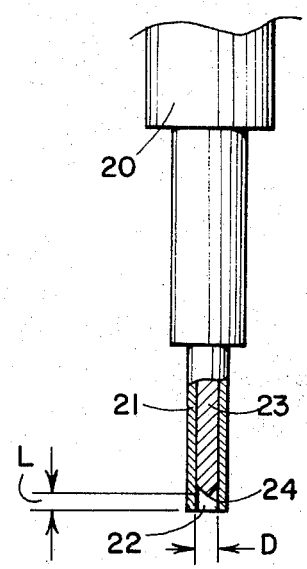
FIG. 3 is an enlarged elevational view of the lower portion of the improved trouble shooting probe of the present invention partly shown in cross section; and, FIG. 4 is an enlarged fragmentary view partly in cross-section of the improved probe of the present invention effecting electrical contact with one of the terminals of the board of FIG. 1.

Referring now to FIG. 3 there is shown the improved trouble shooting probe of the present invention wherein it will be noted that rather than a pin terminating in a single sharp point, the probe includes a rigid elongated tube 21 in the form of a right circular cylinder made as a single unitary piece terminating in a lower open annular end 22. The internal diameter of the open end of the tube as at 22 is indicated at D. In the preferred embodiment of the probe shown in FIG. 3, there is also included a conducting member 23 coaxially fixed within the tube 21 in conductive engagement with the tube and terminating in a sharp point 24 lying on the axis of the tube. This point terminates short of the end of the tube 21 and thus is spaced inwardly from this end by a distance indicated as L.

Figure 4:
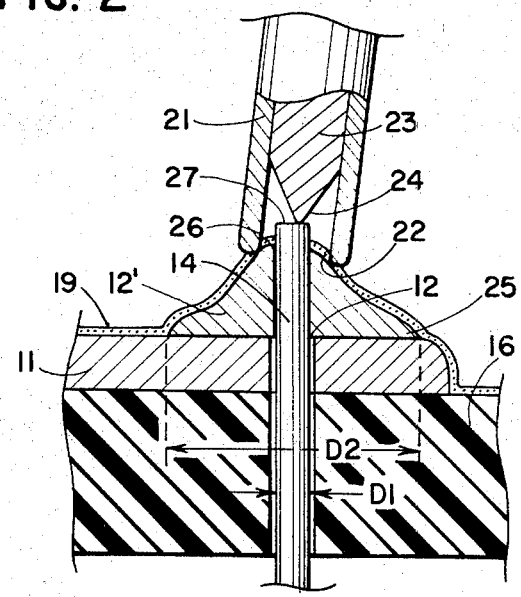

Referring now to FIG. 4, the manner in which the improved probe of the present invention enables trouble shooting to take place with minimum risk of slipping of the probe from the terminal will be evident. In FIG. 4, the particular connection of the lead 14 for the component 16 of FIG. 2 by the solder forming the hump 12' is shown in enlarged cross-section. In making an electrical contact with the probe, the tubular portion 21 is simply positioned over the solder hump.

The internal dimension D of the probe 21 is slightly larger than the outside diameter D1 of the lead 14 so that the tube 21 can telescope over any extending portion of the lead. The typical solder hump 12' as shown will have a base portion 25 of a diameter D2 and will terminate in an upper apex such as indicated at 26. By making the internal dimension D of the probe greater than D1 and less than D2, the annular open end of the tube 21 will engage in annular contact side portions of the solder hump between its base and apex. While not necessary in every instance, usually the extreme free end portion of the lead 14 will extend above the apex as indicated at 27 a short distance. Thus when the probe is positioned as indicated in FIG. 4, the distance L is such that the sharp point 24 of the conducting member 23 within the tube 21 will cut through any lacquer like coating to effect physical and electrical contact with the extended portion of the lead. There is thus provided excellent electrical contact not only through the annular contacting of the open end of the tube 21 with the sides of the solder hump but also through the point 24 of the probe on the extending end 27 of the lead.

OPERATION

In operation, a trouble shooter can very easily position the tube 21 of his probe over the extending portion 27, if any, of the lead at the terminal area, the open end of the tube 21 itself making annular contact with the sides of the solder hump. A sufficient manual pressing force may easily be applied to cut through the lacquer coating 19 to assure proper electrical contact with no fear of slippage of the probe from the terminal area. Thus, since the apex portion 26 of the solder hump is partially received within the open end of the tube 21 so that the annular open end engages the sloping sides of the hump, slippage is inhibited. In addition, any extending portion 27 of the lead itself within the open end of the tube 21 will prevent inadvertent slipping of the tube from the solder hump. Finally, excellent and reliable electrical contact is assured not only through the annular end engagement which represents a large contact area but also through the sharp point engaging any exposed terminal lead.

An incidental advantage of the probe structure is the absence of any exposed sharp point which might prick an operator.

From the foregoing description, it will accordingly be evident that the present invention has provided a vastly improved trouble shooting probe wherein the risk of destruction of portions of the circuit board or terminal is substantially reduced. Moreover, the trouble shooting operation itself can be carried out more rapidly with greater assurance of proper electrical contact and with a minimum of irritation.

What is claimed is:

1. A non-destructive trouble shooting probe for use by a trouble shooter to temporarily effect electrical contact with a selected terminal on a circuit board wherein the terminal normally includes a solder hump connecting a component lead to a circuit on the circuit board and the circuit and board are thereafter treated with an insulative lacquer like coating, said probe including:

a. a rigid conductive open ended tube in the form of a right circular cylinder made as a single unitary piece of internal diameter greater than the outside diameter of the component lead and lesser than the diameter of the base of the solder hump, and
   b. a conductive member fixedly secured coaxially within the tube in conductive engagement with the tube and terminating in a sharp point on the axis of the tube short of the open end of the tube by a given axial distance, whereby the open ended tube may easily be positioned over the hump in a manner to cut through the lacquer like coating to make annular conductive contact with portions of the hump between its base and apex, said given axial distance being such that said conductive member also cuts through any lacquer like coating to effect physical and electrical contact with the free end of the component lead surrounded by the solder hump in those instances in which the free end extends beyond the apex of the hump, the size of the hump in cooperation with the annular open end of the probe and any free end extending portion of the component lead from the apex of the hump, holding the probe on the hump to thereby inhibit slippage and resulting damage to the circuit board and/or terminal.

* * * * *